United States Patent [19]

Chen

[11] Patent Number: 5,176,069

[45] Date of Patent: Jan. 5, 1993

[54] MECHANISM FOR DRYING AND FRYING MEAT

[76] Inventor: Hsing Wan Chen, No. 40, Hsingsheng Rd., Erhlin Chen, Changhua Hsien, Taiwan

[21] Appl. No.: 892,136

[22] Filed: Jun. 2, 1992

[51] Int. Cl.⁵ .................. A47J 27/00; B01F 7/00; B01F 7/02

[52] U.S. Cl. ............................ 99/348; 99/341; 366/144; 366/297; 366/299; 366/331; 366/185

[58] Field of Search ............... 99/348, 341, 468, 483; 366/144-146, 149, 185, 297-301, 331, 601

[56] References Cited

U.S. PATENT DOCUMENTS

| | | | |
|---|---|---|---|
| 1,786,877 | 12/1930 | Thompson | 99/348 |
| 1,844,347 | 2/1932 | Chapman | 99/348 |
| 2,992,813 | 7/1961 | Bonomo et al. | 366/299 |
| 3,648,986 | 3/1972 | Sohn et al. | 366/299 |
| 3,960,368 | 6/1976 | Kishimoto | 366/144 |
| 4,463,572 | 8/1984 | Brown, Jr. | 366/144 |
| 4,650,337 | 3/1987 | Otto | 366/299 |
| 4,818,116 | 4/1989 | Pardo et al. | 99/348 |
| 4,832,502 | 5/1989 | Grutter et al. | 366/185 |
| 5,050,490 | 9/1991 | Yahav et al. | 366/146 |
| 5,070,222 | 12/1991 | Yahav et al. | 99/348 |

*Primary Examiner*—Timothy F. Simone
*Attorney, Agent, or Firm*—Parkhurst, Wendel & Rossi

[57] ABSTRACT

A mechanism for drying and frying meat including a pot supported on a base for receiving the meat to be dried and fried, a tube rotatably disposed on the upper portion of the pot, a stirrer coupled to the tube by a pair of beams and rotatable along the curved inner surface of the pot, a rod rotatably supported between the beams, a number of extensions fixed on the rod and rotatable about the rod in order to stir the meat received in the pot.

12 Claims, 7 Drawing Sheets

MECHANISM FOR DRYING AND FRYING MEAT

BACKGROUND OF THE INVENTION

1. Field of the Invention

The present invention relates to a mechanism, and more particularly to a mechanism for drying and frying meat.

2. Description of the Prior Art

Dried and fried meat, especially pork or fish, is one kind of Chinese food and is produced by drying and frying processes. Previously, highly skilled persons are required to produce the dried and fried meat.

In order to solve the problem, one type of drying and frying mechanism is developed and shown in FIG. 7 and includes a pot 90 disposed in an upper portion of a base 91, a stove 92 disposed below the pot 90 for heating the meat disposed in the pot 90, and either or both of two stirrers 93, 94 are disposed in the pot 90 and each driven by a motor 95, 96 in order to stir the meat disposed in the pot 90. Unfortunately, the meat can not be stirred thoroughly, in addition, the dried and fried meat can not be easily taken out.

The present invention has arisen to mitigate and/or obviate the afore-described disadvantages of the conventional mechanisms for drying and frying meat.

SUMMARY OF THE INVENTION

The primary objective of the present invention is to provide a mechanism for drying and frying meat in which the meat can be stirred thoroughly and the dried and fried meat can be easily removed.

In accordance with one aspect of the invention, there is provided a mechanism for drying and frying meat comprising a base, a pot supported on the base for receiving the meat to be dried and fried and including a curved inner surface, means for heating the pot, a tube rotatably and laterally supported in an upper portion of the pot, means for rotating the tube, a stirrer fixed to the tube by a pair of beams and located close to the inner surface of the pot and rotated in concert with the tube, a rod rotatably supported between the beams, a plurality of extensions fixed integral on the rod and rotated in concert with the rod, and means for rotating the rod, whereby, the meat received in the pot is stirred by the stirrer when the tube rotates and is stirred by the extensions when the rod rotates.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
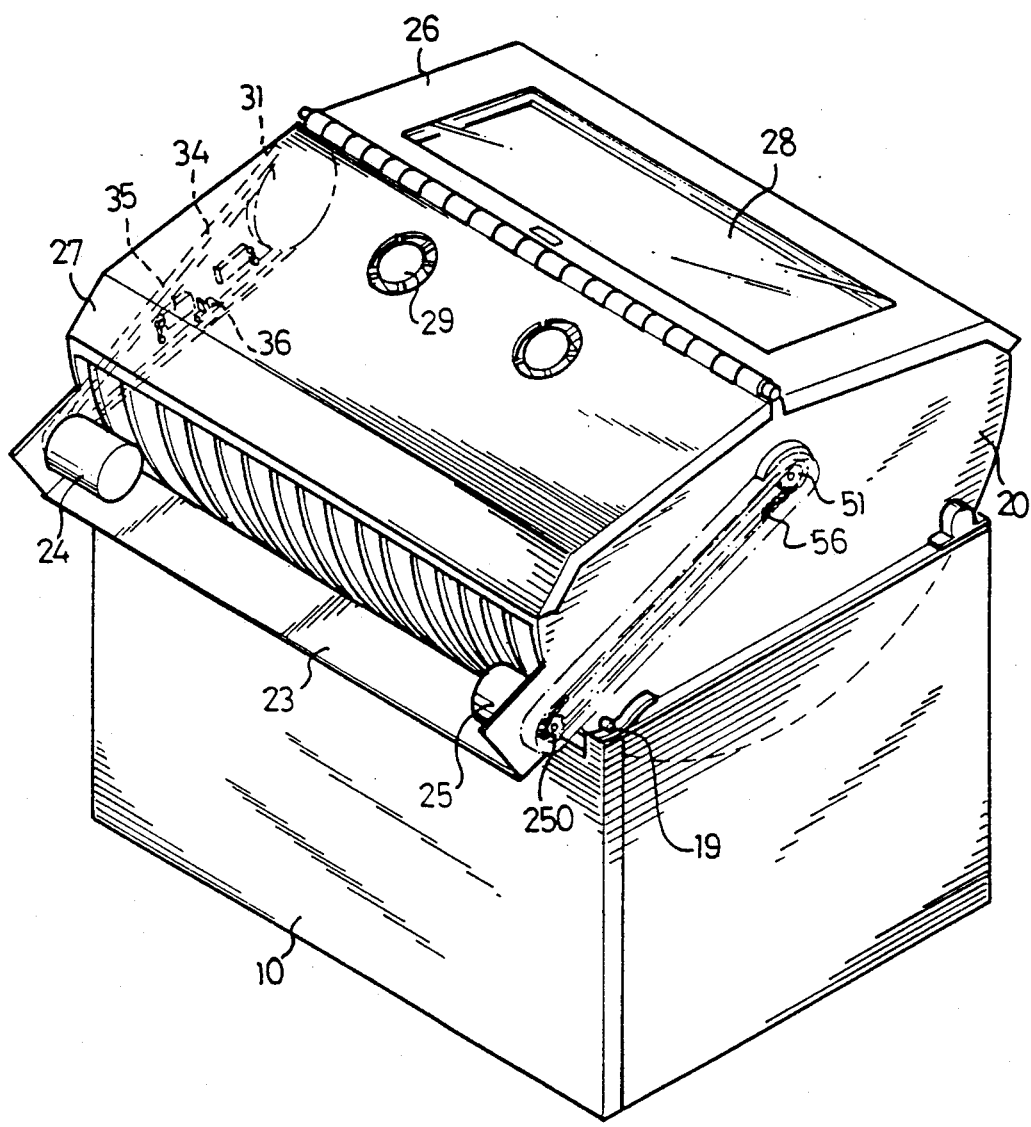
FIG. 1 is a rear, top and left perspective view of a mechanism in accordance with the present invention.
Figure 2:
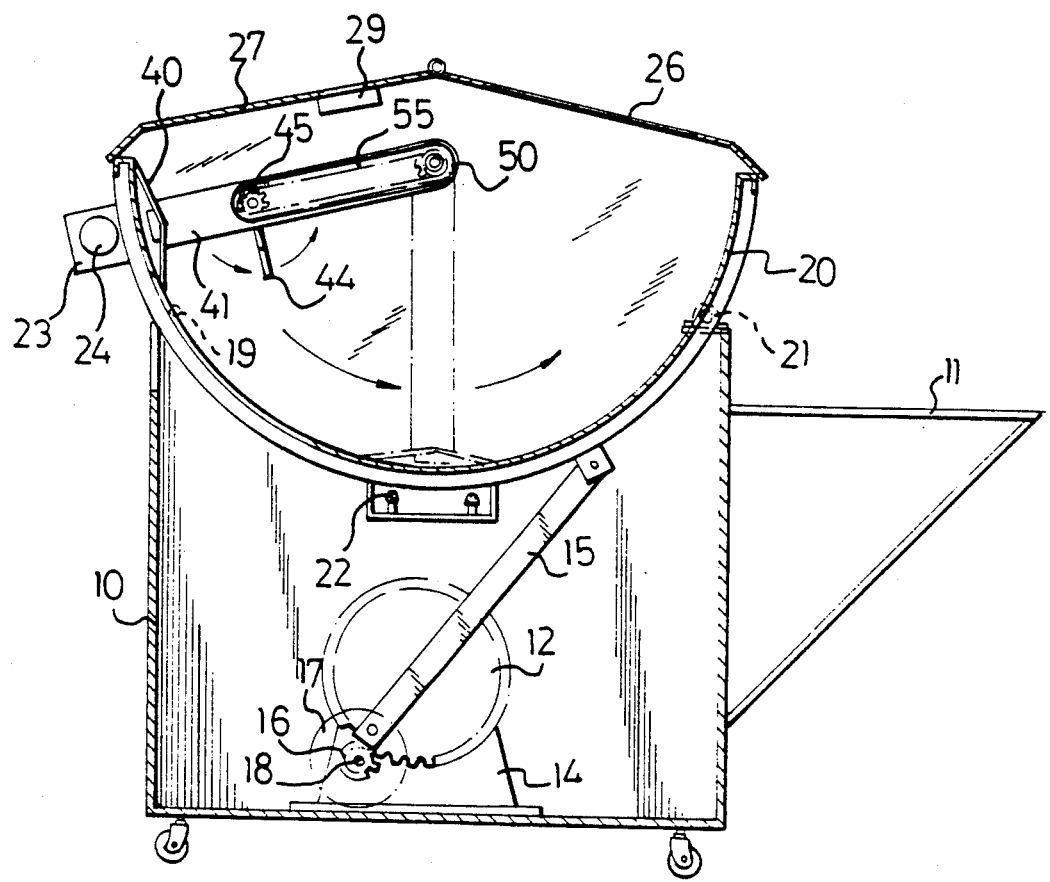
FIG. 2 is a cross sectional view of the mechanism taken along lines 2—2 of FIG. 1.
Figure 3:
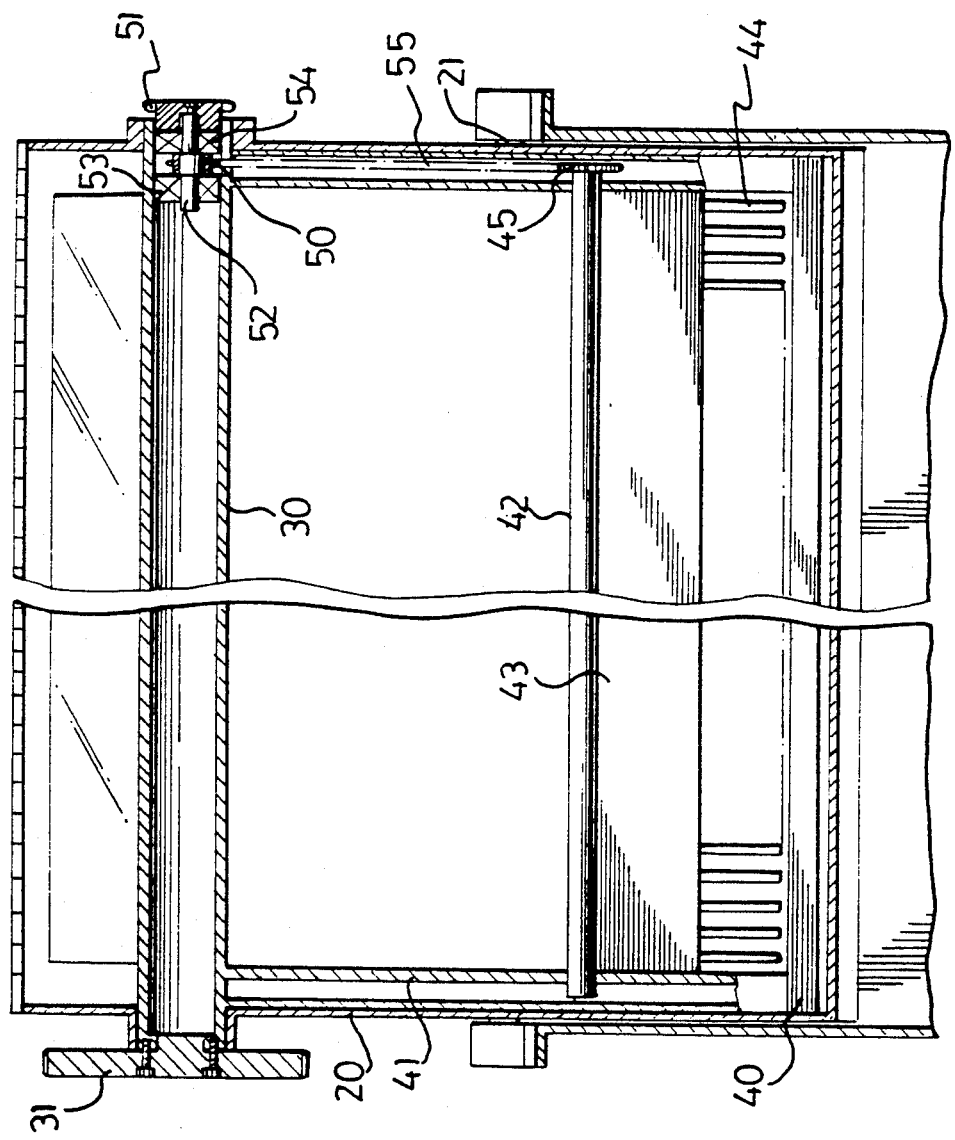
FIG. 3 is a cross sectional view of the mechanism taken along lines 3—3 of FIG. 1.

Referring to the drawings, and initially to FIGS. 1, 2 and 3, a mechanism in accordance with the present invention is provided for drying and frying meat, particularly pork and fish, and comprises generally a base 10 having a pot 20 pivotally supported at one side at a pivot axle 21, the pot 20 is rotatable about the pivot axle 21 (FIG. 6) so that the meat disposed in the pot 20 can be easily removed. The base 10 includes an open upper portion for receiving the lower portion of the pot 20. A table 11 is disposed on the front portion of the base 10.

A gear 12 is rotatably disposed on a support 14 and is engaged with a pinion 16 which is fixed on the spindle 18 of a motor 17 so that the gear 12 can be rotated by the motor 17. A post 15 has one end pivotally coupled to the peripheral portion of the gear 12 and has the other end pivotally coupled to the lower portion of the pot 20, preferably close to said pivot axle, such that the pot 20 can be caused to rotate about the pivot axle 21 by the motor 17, best shown in FIG. 6, and such that the dried and fried meat can be easily discharged from the pot 20. A pair of projections 19 extend outward from the side portions of the pot 20 for engagement on the upper portion of the base 10 in order to support the pot 20.

The pot 20 has a curved lower portion located in the upper portion of the base 10 and having a stove 22 disposed in the bottom thereof, the stove 22 is connected to a gas supplying source, such as a gas tank (not shown) disposed in the base 10, for heating the pot 20 and the meat disposed in the pot 20. A bracket 23 is disposed on the rear portion of the pot 20 for supporting two motors 24, 25. The pot 20 includes an open top enclosed by a two-piece cover which includes a rotatable board 26 pivotally coupled to a fixed board 27 which is fixed on the upper and rear portion of the pot 20. A transparent window 28 is provided in the rotatable board 26 so that the interior of the pot 20 can be seen, and two fans 29 are disposed in the fixed board 27 for discharging the steam or humidity contained in the pot 20.

Figure 4:
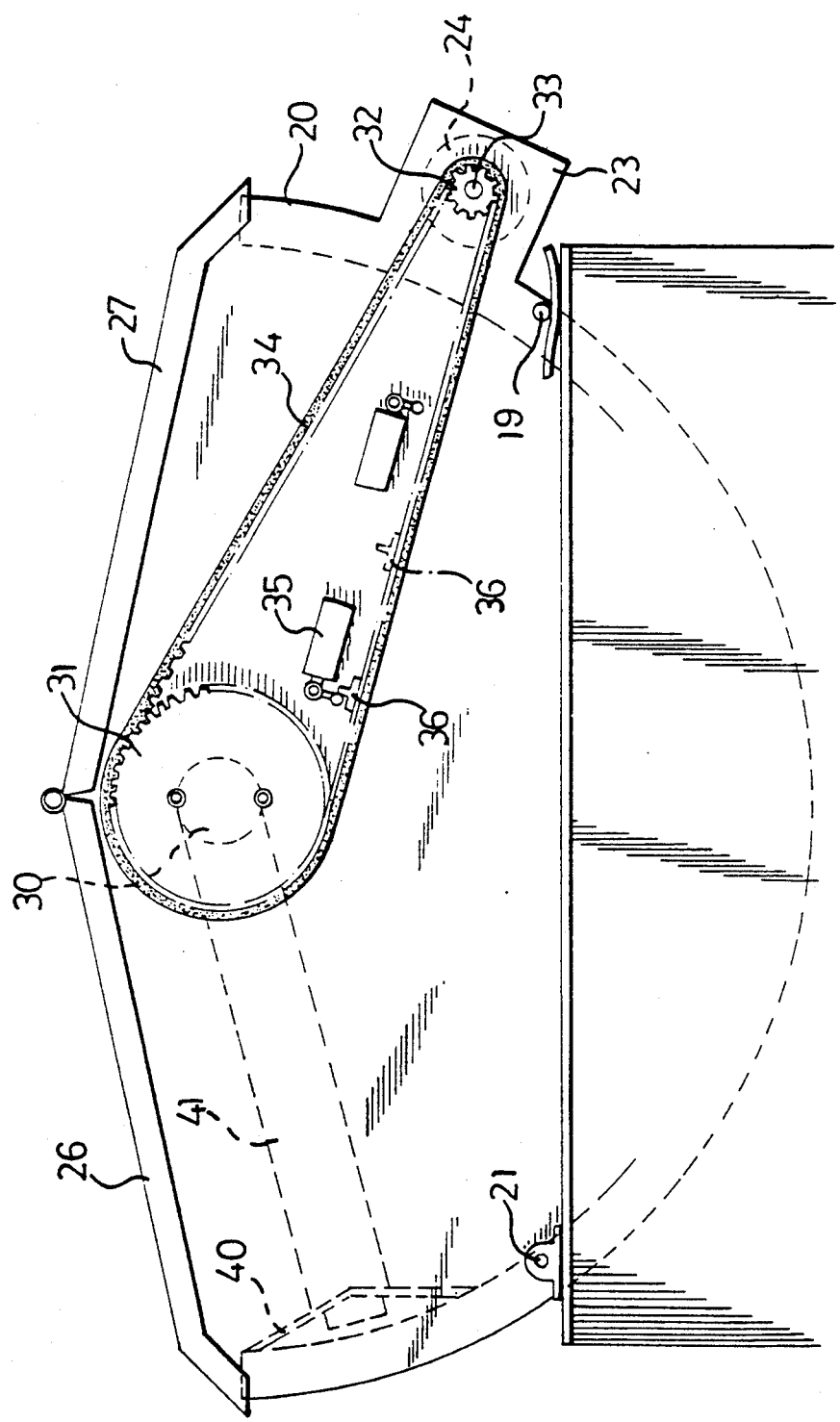
FIG. 4 is a right side view of the mechanism.

A tube 30 is rotatably and laterally disposed in the upper portion of the pot 20 and includes a gear 31 fixed on one end thereof. As is best shown in FIG. 4, the gear 31 is coupled to a pinion 32 by a belt 34 and the like, the pinion 32 is fixed on the spindle 33 of the motor 24 such that the gear 31 and the tube 30 can be rotated by the motor 24. A pair of microswitches 35 are disposed on the side portion of the pot 20, and a stop 36 is disposed on the belt 34 and movable and contactable between the microswitches 35 in order to control the rotational directions of the motor 24.

Referring next to FIGS. 4 and 5, and again to FIG. 3, a stirrer such as a plate 40 having an inverted V shape has two ends fixed to the end portions of the tube 30 by a pair of beams 41 and is located close to the curved inner and bottom surface of the pot 20. The plate 40 and the beams 41 are caused to swing by the motor 24. The tube 30 is located in the center of the curvature of the inner surface of the pot 20 such that the plate 40 is movable along the inner surface of the pot 20, best shown in FIG. 4. A rod 42 is rotatably engaged between the beams 41 and has a panel 43 fixed integral thereon, and a plurality of extensions 44 formed integral on the panel 43. A pinion 45 is fixed on one end of the rod 42.

Figure 5:
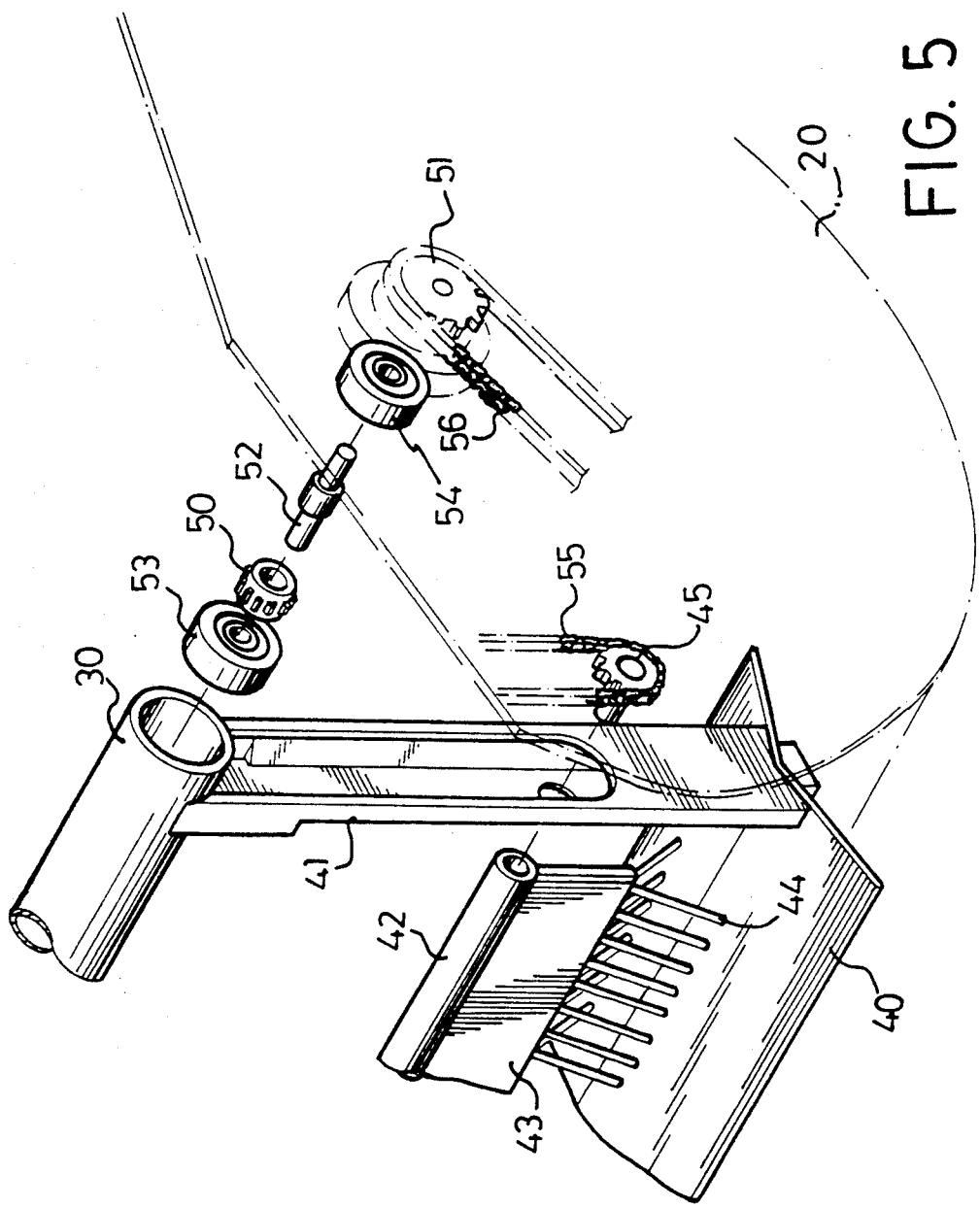
FIG. 5 is a partial exploded view of the mechanism.

A pinion 50 and a gear 51 are fixed on a shaft 52 which is rotatably supported in the other end of the tube 30 distal from the gear 31 by the bearings 53, 54, in which the pinion 50 is aligned with the pinion 45 and coupled to the pinion 45 by a belt 55 and the like so that the rod 42 and the panel 43 and the extensions 44 can be caused to rotate when the pinion 45 rotates. As shown in FIGS. 1 and 5, the gear 51 is coupled to a pinion 250 by a belt 56, and the pinion 250 is fixed to the spindle of the motor 25 such that the gear 51 can be rotated by the motor 25 and such that the panel 43 and the extensions 44 can be caused to rotate about the rod 42 by the motor 25.

In operation, the plate 40 is caused to swing in the pot 20 by the motor 24 for scraping the meat stick on the inner and bottom surface of the pot 20 and the panel 43 and the extensions 44 are caused to rotate about the rod 42 for stirring the meat contained in the pot 20, whereby, the meat contained in the pot 20 can be heated and dried by the stove 22 and can be stirred by the panel 43 and the extensions 44.

Figure 6:
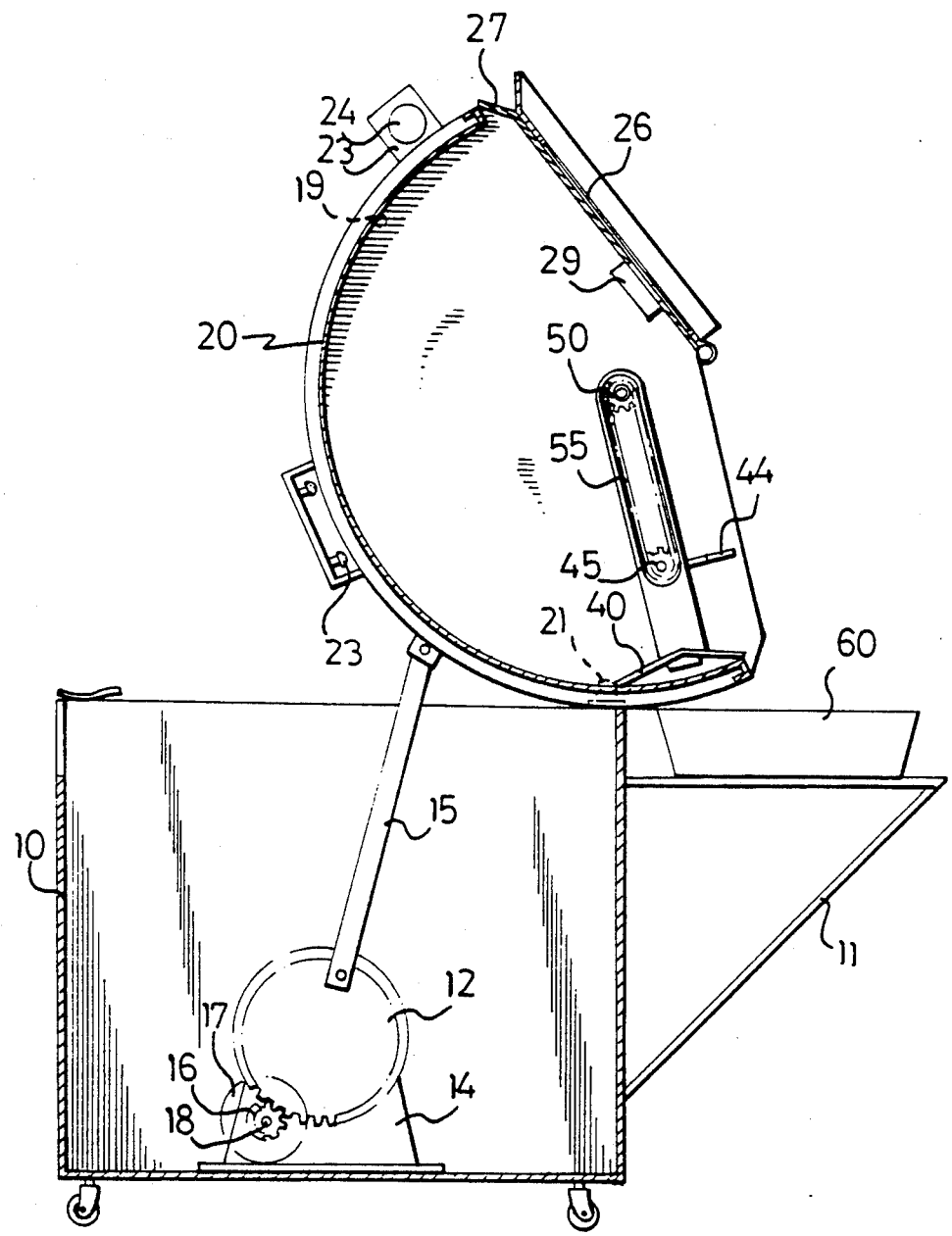
FIG. 6 is a cross sectional view similar to FIG. 2 illustrating the operation of the mechanism.
Figure 7:
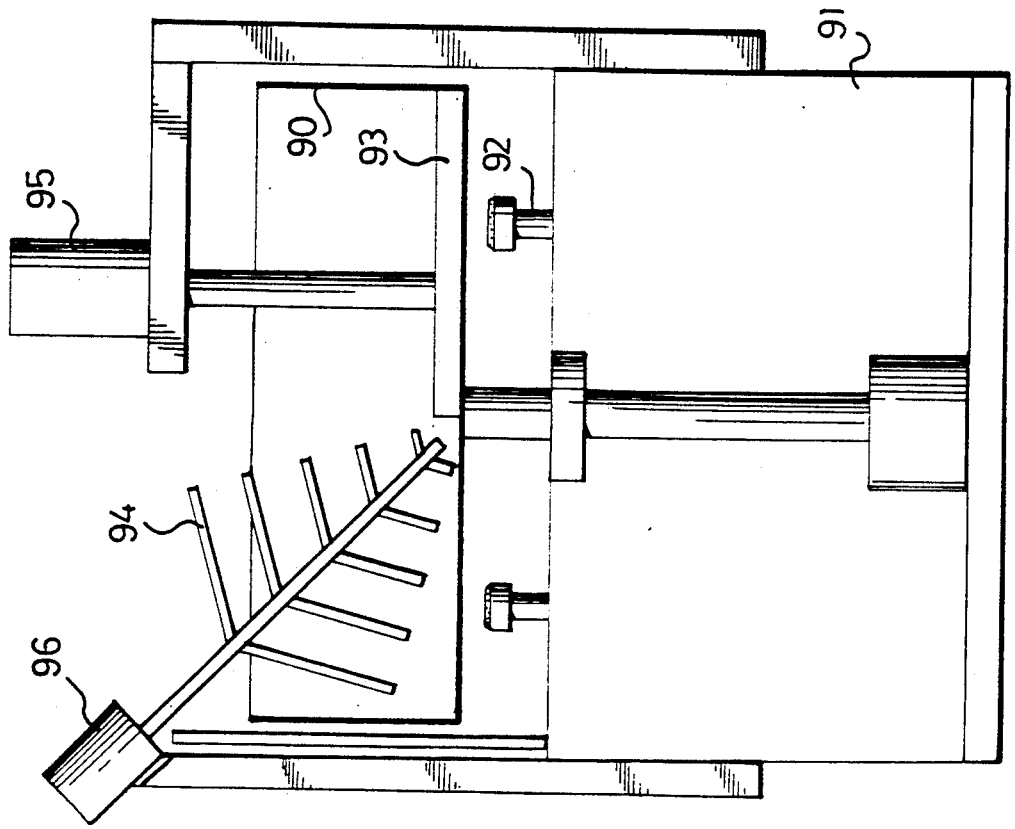
FIG. 7 is a cross sectional view of a conventional mechanism for drying and frying meat.

Referring next to FIG. 6, after drying and frying operations, the pot 20 is caused to rotate about the pivot axle 21 by the motor 17 such that the dried an fried meat can be easily discharged from the pot 20 and can be easily collected in a pan 60 disposed on the table 11.

Accordingly, meat can be stirred thoroughly by the mechanism in accordance with the present invention and the dried and fried meat can be easily discharged.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A mechanism for drying and frying meat comprising a base, a pot supported on said base for receiving said meat to be dried and fried and including a curved inner surface, means for heating said pot, a tube rotatably and laterally supported in an upper portion of said pot, means for rotating said tube, a stirrer fixed to said tube by a pair of beams and located close to said curved inner surface of said pot and rotated in concert with said tube, a rod rotatably supported between said beams, a plurality of extensions fixed integral on said rod and rotated in concert with said rod, and means for rotating said rod, whereby, said meat received in said pot is stirred by said stirrer when said tube rotates and is stirred by said extensions when said rod rotates.

2. A mechanism according to claim 1, wherein said means for rotating said tube includes a gear fixed on a first end of said tube, a motor disposed on said pot and including a pinion fixed on a spindle thereof and coupled to said motor, whereby, said tube is rotated by said motor.

3. A mechanism according to claim 2, wherein a pair of microswitches are disposed on said pot and located between said gear and said pinion, said gear is coupled to said pinion by a belt, and a stop fixed on said belt and movable between said microswitches in order to actuate said microswitches and so as to control rotation of said motor.

4. A mechanism according to claim 1, wherein said means for rotating said rod includes a first pinion fixed on one end of said rod and located within one of said beams, a second pinion and a gear rotatably supported in one end of said tube, said second pinion aligned with said first pinion and coupled to said first pinion, said gear extended outward of said pot, a motor disposed on said pot and including a spindle having a third pinion fixed thereof and coupled to said gear, whereby, said rod is rotated by said motor.

5. A mechanism according to claim 1, wherein said pot includes an open top enclosed by a two piece cover, said two piece cover includes a first piece fixed on one side of said open top of said pot and a second piece pivotally coupled to said first piece for enclosing the other side of said open top of said pot, said first piece includes at least one fan disposed therein for discharging steam contained in said pot, and said second piece includes a transparent window for viewing an interior of said pot.

6. A mechanism according to claim 1, wherein said pot is pivotally coupled to said base at a pivot axle close to one side thereof and rotatable about said pivot axle, said mechanism further comprising a motor disposed in said base, a pinion fixed on a spindle of said motor, a gear engaged with said pinion and rotated by said motor, a post having a first end pivotally coupled to a peripheral portion of said gear and having a second end pivotally coupled to a bottom portion of said pot, whereby, said pot is rotated about said pivot axle when said gear is rotated by said motor.

7. A mechanism according to claim 6, wherein said second end of said post is located close to said pivot axle.

8. A mechanism for drying and frying meat comprising a base, a pot pivotally supported on said base at a pivot axle close to one side thereof for receiving said meat to be dried and fried and including a curved inner surface, means for heating said pot, a tube rotatably and laterally supported in an upper portion of said pot, means for rotating said tube, a stirrer fixed to said tube by a pair of beams and located close to said curved inner surface of said pot and rotated in concert with said tube, a rod rotatably supported between said beams, a plurality of extensions fixed integral on said rod and rotated in concert with said rod, and means for rotating said rod, a motor disposed in said base, a pinion fixed on a spindle of said motor, a gear engaged with said pinion and rotated by said motor, a post having a first end pivotally coupled to a peripheral portion of said gear and having a second end pivotally coupled to a bottom portion of said pot, said pot being rotated about said pivot axle when said gear is rotated by said motor, whereby, said meat received in said pot is stirred by said stirrer when said tube rotates and is stirred by said extensions when said rod rotates.

9. A mechanism according to claim 8, wherein said means for rotating said tube includes a second gear fixed on a first end of said tube, a second motor disposed on said pot and including a second pinion fixed on a spindle thereof and coupled to said second motor, whereby, said tube is rotated by said second motor.

10. A mechanism according to claim 9, wherein a pair of microswitches are disposed on said pot and located between said second gear and said second pinion, said second gear is coupled to said second pinion by a belt, and a stop fixed on said belt and movable between said microswitches in order to actuate said microswitches and so as to control rotation of said second motor.

11. A mechanism according to claim 8, wherein said means for rotating said rod includes a second pinion fixed on one end of said rod and located within one of said beams, a third pinion and a second gear rotatably supported in one end of said tube, said third pinion aligned with said second pinion and coupled to said second pinion, said second gear extended outward of said pot, a second motor disposed on said pot and including a spindle having a fourth pinion fixed thereof and coupled to said second gear, whereby, said rod is rotated by said second motor.

12. A mechanism according to claim 8, wherein said pot includes an open top enclosed by a two piece cover, said two piece cover includes a first piece fixed on one side of said open top of said pot and a second piece pivotally coupled to said first piece for enclosing the other side of said open top of said pot, said first piece includes at least one fan disposed therein for discharging steam contained in said pot, and said second piece includes a transparent window for viewing an interior of said pot.

* * * * *